Sept. 11, 1951 A. C. CLEGHORN 2,567,423
POWERED CARRIER
Filed July 16, 1949 3 Sheets-Sheet 1

Inventor
Andrew C. Cleghorn
By
ATTORNEYS

Sept. 11, 1951     A. C. CLEGHORN     2,567,423
POWERED CARRIER

Filed July 16, 1949                           3 Sheets-Sheet 2

Inventor

Andrew C. Cleghorn

By

ATTORNEYS

Sept. 11, 1951 A. C. CLEGHORN 2,567,423
POWERED CARRIER
Filed July 16, 1949 3 Sheets-Sheet 3

Inventor
Andrew C. Cleghorn
By
ATTORNEYS

Patented Sept. 11, 1951

2,567,423

UNITED STATES PATENT OFFICE 2,567,423

POWERED CARRIER

Andrew C. Cleghorn, Willows, Calif.

Application July 16, 1949, Serial No. 105,170

2 Claims. (Cl. 180—19)

This invention is directed to, and it is an object to provide, a powered load carrier in the form of a manually steered, self-propelled cart especially designed, but not limited, for use by campers, hunters, fishermen, forest fire fighters, or the like, to transport supplies and equipment over relatively narrow trails.

Another object of the invention is to provide a powered carrier or cart, as above, which is easy and convenient to steer and maneuver; such carrier being supported by a single, centrally disposed, driven wheel, and transverse handles projecting lengthwise from the carrier for grasping by the operator.

A further object of the invention is to provide a powered carrier, for the purpose described, which is relatively light weight and well balanced, so that the cart structure may be maintained upright, and maneuvered, by hand without undue exertion by the operator.

An additional object of the invention is to provide a powered carrier which is capable of supporting and transporting a substantial load over terrain, such as mountain trails, which cannot be traversed by multi-wheel vehicles.

It is also an object of the invention to provide a powered carrier which is designed for ease and economy of manufacture.

A further object of the invention is to provide a practical and reliable powered carrier, and one which will be exceedingly effective for the purpose for which it is designed.

These objects are accomplished by means of such structure and relative arrangement of parts as will fully appear by a perusal of the following specification and claims.

Figure 1:
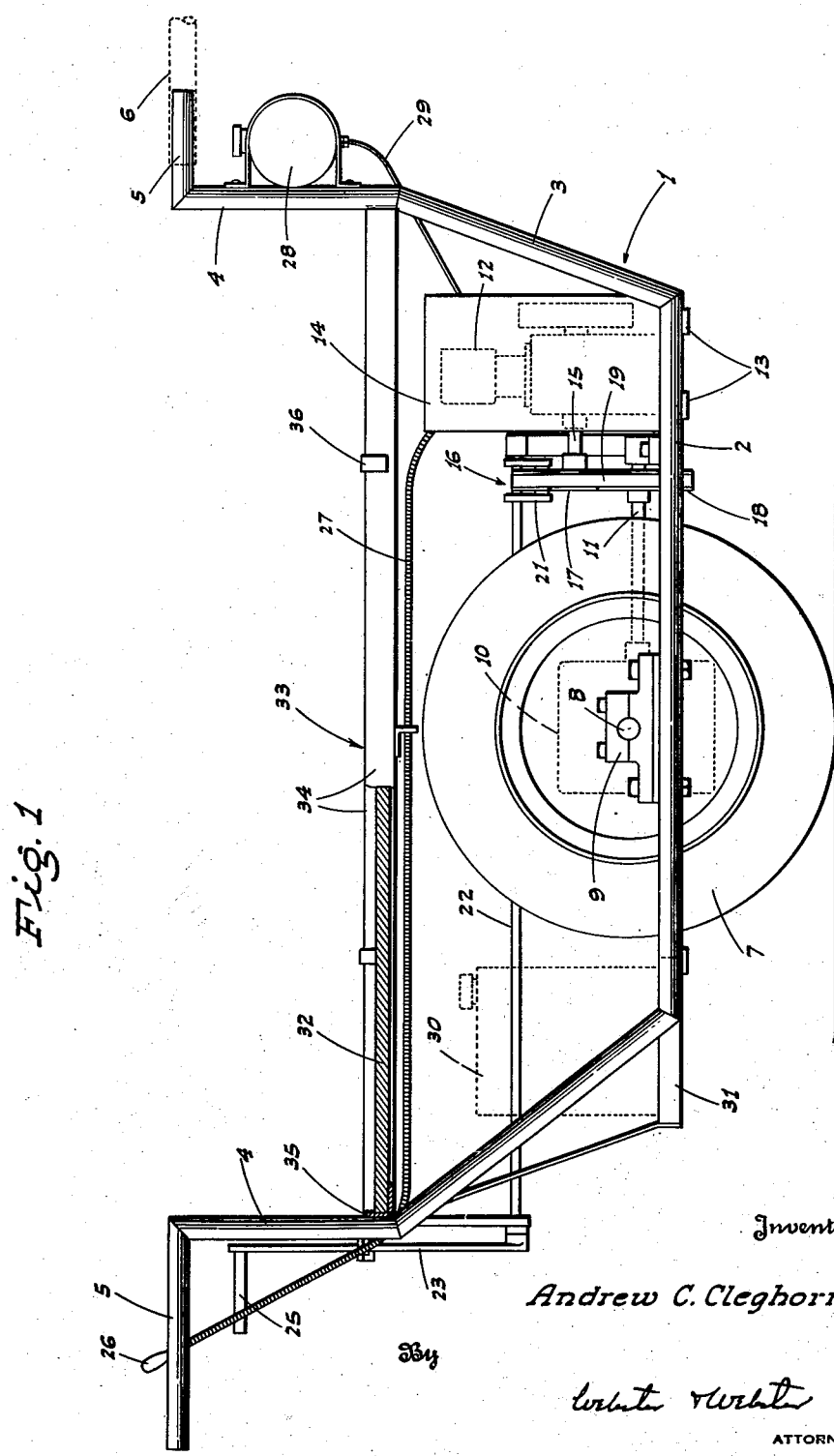
Fig. 1 is a side elevation of the powered carrier; the rectangular border frame for the platform being partially broken away to show the latter.

Referring now more particularly to the characters of reference on the drawings, the novel, powered carrier or cart comprises an elongated drop-center main frame, indicated generally at 1; such frame being of open skeleton construction and including transversely spaced, longitudinal bottom beams 2, each of which has upwardly and outwardly inclined end legs 3. At their upper ends the legs 3 are secured to upstanding corner or end posts 4 whereby a pair of said end posts is provided, in transversely spaced relation, at each end of the main frame 1. The main frame 1 has the side portions thereof connected together in rigid relation by suitable cross members; the frame being mainly of light-weight metallic tubular construction.

At the upper ends thereof the end posts 4 are each formed with a longitudinal outwardly projecting handle 5; the handles at the rear end of the carrier being of somewhat greater length than the handles at the forward end. However, the relatively short handles 5 at the forward end of the carrier may be provided with extension handles 6 if desired, so that in addition to the person controlling the carrier from the rear by grasping the adjacent handles, another person can assist by grasping the extension handles 6 ahead of the carrier.

A single, pneumatic tire wheel 7 is journaled in the drop-center of the main frame 1, centrally of the sides and ends thereof, by means of a cross shaft 8 and journals 9. A reduction gear box 10 is fixed in connection with one of the journals 9 in driving relation to the cross shaft 8, and a drive shaft 11 extends forwardly from the gear box 10.

A small light-weight gasoline engine 12 is mounted in the drop-center of the main frame ahead of the wheel 7; such engine being supported by transverse bars 13, and is enclosed within a protective housing 14. The engine shaft 15 projects toward the wheel 7, and driving connections, indicated generally at 16, extend between the engine shaft 15 and gear box drive shaft 11.

Such driving connections 16 comprise an endless belt and pulley system, which includes a pulley 17 on shaft 15; a pulley 18 on shaft 11; and an endless belt 19 trained about and extending between such pulleys. The endless belt 19 is relatively long and includes a belt tightening pulley 20 cooperating with one run between the pulleys 17 and 18; the belt tightening pulley 20 being carried in a radial fork 21 which projects from a longitudinal, control shaft 22 which extends lengthwise in the main frame 1 to adjacent its rear end. At its rear end the control shaft 22 is fitted with an upstanding clutch lever 23 which projects, intermediate its ends, through a notched, slotted guide 24; there being a handle 25 on the upper end of the lever 23 to facilitate manual shifting thereof in the notched, slotted guide 24. By shifting the clutch lever 23 in one direction or the other, the pulley 20 is shifted by the fork 21 to a belt tightening or belt loosening position, respectively. In this manner drive of the wheel 7 from the engine 12 may be effectively controlled by an operator at the rear end of the carrier. For convenience, the handle 25 is manually accessible from closely adjacent one of the rear handles 5.

An engine throttle control member 26 is mounted adjacent the other rear handle 5 for ease of manual access, and said member 26 is adapted for the regulation of engine speed by a suitable connection which includes a flexible conduit 27.

The numeral 28 indicates the fuel tank for the engine 12; such fuel tank 28 being mounted in connection with, and extending between, the front end posts 4, and a fuel pipe 29 leads between tank 28 and said engine.

An additional fuel supply is carried in a spare fuel can (or cans) 30 which seats in a horizontal rack 31 secured in the drop-center of the frame rearwardly of the wheel 7.

A substantially horizontal, load supporting platform 32 is disposed above the wheel 7 and engine 12, lying in a plane adjacent the lower end portions of the end posts 4; such platform 32 being removably supported in a rectangular border frame, indicated generally at 33. The rectangular border frame 33 includes side beams 34 and end beams 35 rigidly connected together at the ends, as well as to the end posts 4, whereby to enhance rigidity of the entire frame structure.

The border frame 33 is constructed of beams of inwardly facing right angle configuration, whereby the bottom flanges of said beams form seats for the edge portions of the platform 32.

The side beams 34 are fitted at spaced points with rope hooks 36, whereby ropes may be engaged over the load on the platform 32 and secured to said hooks.

When the above described powered carrier is in use, with a load on the platform 32, one operator walks behind the carrier, grasping the handles 5. If desired, another person may assist by walking ahead of the carrier and grasping the extension handles 6.

The carrier is thus maintained upright, and steered with respect to the intended direction of travel; the wheel 7 effectively driving the carrier along the ground.

Figure 2:
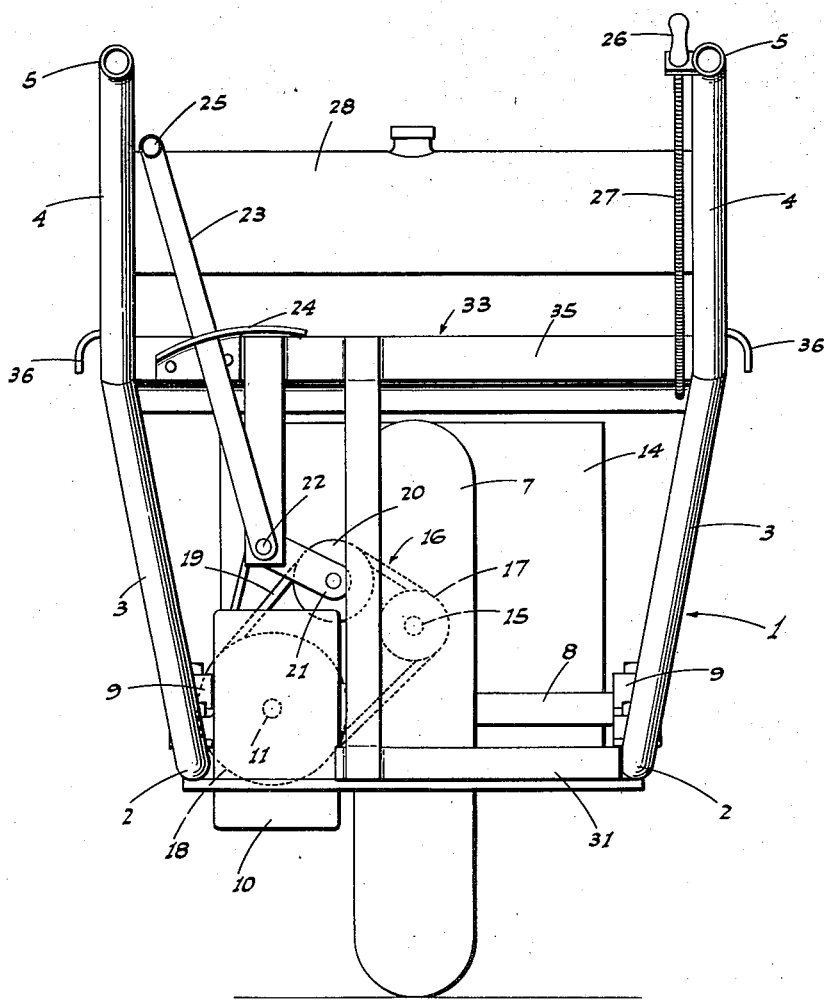
Fig. 2 is a rear end view of the carrier.
Figure 3:
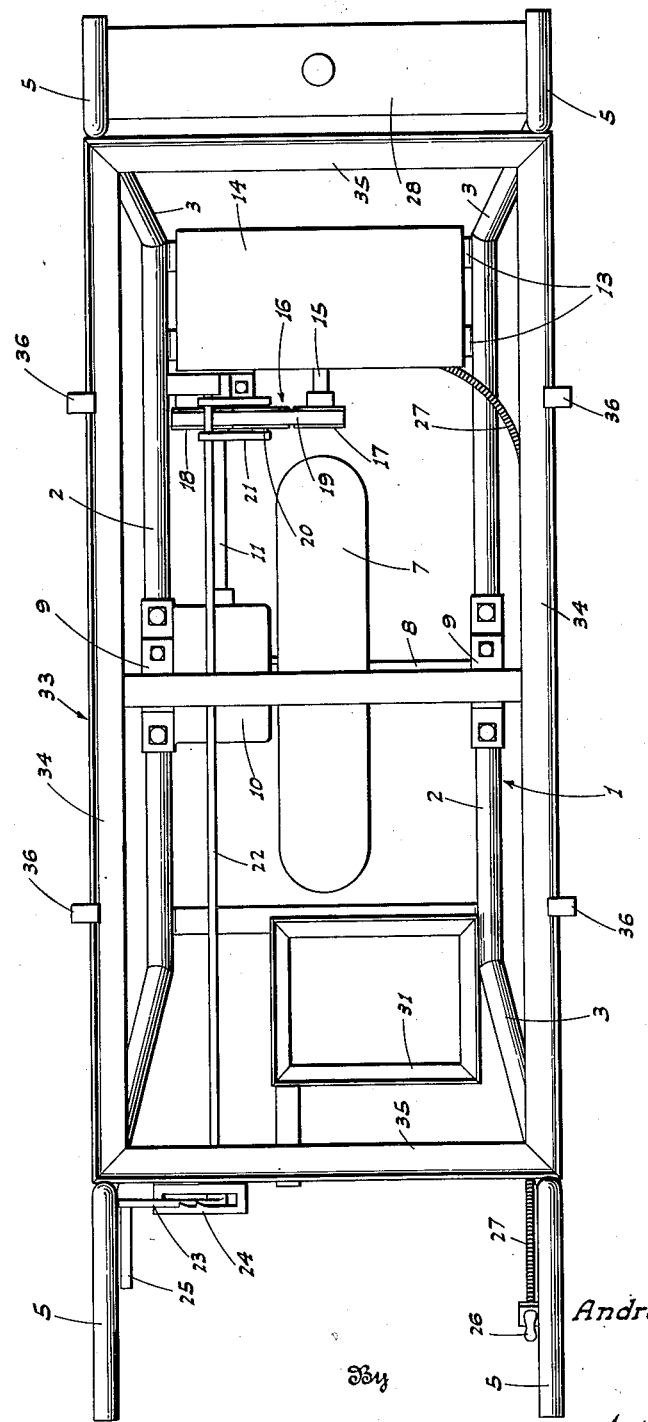
Fig. 3 is a plan view of the carrier with the platform removed.

In order to provide adequate lateral clearance, the sides of the carrier below the end posts 4 taper downwardly and inwardly. See Fig. 2. This assures that the carrier can work along relatively narrow trails without undue engagement with obstructions.

The carrier is extremely useful over terrain not accessible by multi-wheel vehicles, as—for example—on mountain trails; the carrier being adapted to transport the supplies and equipment of campers, hunters, fishermen, forest fire fighters, or the like. While designed for this type of use, it is of course understood that the carrier may be adapted to other purposes.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A powered carrier comprising an elongated drop-center frame of skeleton form, the frame including transversely spaced longitudinal bottom beams having upwardly and outwardly inclined end legs and upstanding posts at the upper ends of said legs; a single wheel journaled between the bottom beams substantially centrally of the drop-center of the frame, an engine mounted on the drop-center of the frame lengthwise thereof beyond the wheel, releasable driving connections between the engine and wheel, a load supporting platform above the wheel and engine mounted on the frame in substantially the horizontal plane of the lower end portions of the posts, and handles projecting lengthwise and outwardly from at least one pair of said posts at the upper ends thereof; the frame including an open rectangular border frame removably supporting the platform, said border frame being of inwardly and upwardly facing angle form in section to provide a seat for the platform.

2. A powered carrier comprising a frame having a rectangular load-platform supporting portion and posts upstanding from the rear corners of said portion, there being handles projecting rearwardly from the posts, a single wheel supported in the frame below said top portion; wheel drive means comprising an engine mounted below said top portion and ahead of the wheel and having a drive shaft extending lengthwise of the carrier, another shaft parallel to said drive shaft and laterally offset therefrom and from the wheel, drive connections between said offset shaft and the wheel, alined pulleys on the shafts, an initially slack belt extending between the pulleys, and belt tightening means comprising a pulley engaging the belt, a control shaft for the tightener pulley laterally offset therefrom and from the wheel and supported in the frame for rotation, a radial arm on the forward end of said control shaft on which the tightener pulley is mounted, said control shaft extending rearwardly past the wheel to the rear end of said frame portion, and a lever upstanding from the rear end of the control shaft in a longitudinal plane adjacent that of the posts and disposed therebetween; there being releasable holding means for the lever.

ANDREW C. CLEGHORN.

REFERENCES CITED

The following references are of record in the file of this patent:

UNITED STATES PATENTS

| Number | Name | Date |
| --- | --- | --- |
| 1,856,683 | Ziegler | May 3, 1932 |
| 1,905,589 | Hoffman et al. | Apr. 25, 1933 |
| 2,239,122 | Stokes | Apr. 22, 1941 |
| 2,253,288 | De Lucchi | Aug. 19, 1941 |
| 2,509,824 | Johnson | May 30, 1950 |

FOREIGN PATENTS

| Number | Country | Date |
| --- | --- | --- |
| 4,968 | Great Britain | Nov. 13, 1913 |
| 9,828 | France | Dec. 1, 1908 |
| 49,891 | Netherlands | Feb. 15, 1941 |
| 195,196 | Switzerland | Jan. 15, 1938 |
| 379,572 | Germany | Aug. 24, 1923 |
| 580,222 | Great Britain | Aug. 30, 1946 |